United States Patent [19]

Solomon

[11] 4,422,560

[45] Dec. 27, 1983

[54] FRYPAN LID

[75] Inventor: Harry Solomon, Ville St. Laurent, Canada

[73] Assignee: Toastess Inc., Pointe Claire, Canada

[21] Appl. No.: 409,825

[22] Filed: Aug. 20, 1982

[51] Int. Cl.³ .............................................. B65D 51/00
[52] U.S. Cl. .................................................... 220/377
[58] Field of Search ................ 220/352, 377; 126/384, 126/386

[56] References Cited

U.S. PATENT DOCUMENTS 3,598,105 8/1971 Matteson .............................. 220/377
3,857,381 12/1974 Kato .................................... 220/377

Primary Examiner—George T. Hall

Attorney, Agent, or Firm—Alan Swabey; Robert Mitchell; Guy Houle

[57] ABSTRACT

A frypan lid comprises an upper transparent plastic cover and a lower heat resistant plastic collar fixedly connected to the transparent cover and adapted to fit on a rim of the frying pan. The collar acts as a heat insulating body between the cover and the frying pan so as to prevent heat generated by the frying pan during use from adversely affecting the cover. The frypan lid prevents grease or the like from spattering out over the area immediately surrounding the pan, while at the same time enabling one to view the contents of the pan. Since both the cover and collar are made of plastics, the lid is also light-weight and practically non-breakable.

10 Claims, 2 Drawing Figures

FRYPAN LID

BACKGROUND OF THE INVENTION

The invention relates to a frypan lid and, more particularly, to a transparent lid for electric frying pans.

Various attempts have been made to manufacture a frypan lid which prevents grease or the like from spattering out over the area immediately surrounding the pan, while at the same time enabling one to view the contents of the pan. In Canadian Pat. No. 137,105, for instance, there is disclosed a frypan cover made in two sections, comprising a lower section adapted to rest on the frying pan and an upper section hingedly connected to the lower section. Both lower and upper sections are made of sheet metal. Whenever it is desired to give attention to the contents of the frying pan, the upper section may be swung back on the hinge to an open position, the lower section remaining on the frying pan to prevent the grease from spattering out over the stove and floor. Such cover thus requires manipulation in order to open the upper section for viewing and therefore does not allow one to view directly the contents of the pan.

It is also known to use frypan covers made wholly of heat resistant glass, such as PYREX (trademark). Such covers, although being transparent, are relatively heavy and easily breakable.

To Applicant's knowledge, it has never occurred to one skilled in the art to substitute a transparent plastic material for the heat resistant glass conventionally employed, since the transparent plastics which are economically available are known to deteriorate when placed in direct contact with the hot rim of a frypan in use, which may reach temperatures up to 450° F.

SUMMARY OF THE INVENTION

It is therefore an object of the present invention to overcome the above drawbacks and to provide a frypan lid which is not only transparent but also light-weight and practically non-breakable.

In accordance with the invention, there is provided a lid for a frying pan, comprising an upper transparent plastic cover and a lower heat resistant plastic collar fixedly connected to the transparent cover and adapted to fit on a rim of the frying pan. The collar acts as a heat insulating body between the cover and the frying pan so as to prevent heat generated by the frying pan during use from adversely affecting the cover.

Thus, by interposing between the transparent plastic cover and the frying pan a heat resistant plastic collar which also serves as a heat insulating body, the high temperature produced by the frying pan is prevented from reaching the cover and adversely affecting it. Since both the cover and collar are made of plastic, the lid of the invention is relatively light-weight and practically non-breakable.

BRIEF DESCRIPTION OF THE DRAWINGS

Further advantages and features of the invention will become more apparent from the following detailed description of a preferred embodiment thereof as illustrated by way of example in the accompanying drawings, wherein.

DESCRIPTION OF PREFERRED EMBODIMENTS

Figure 1:
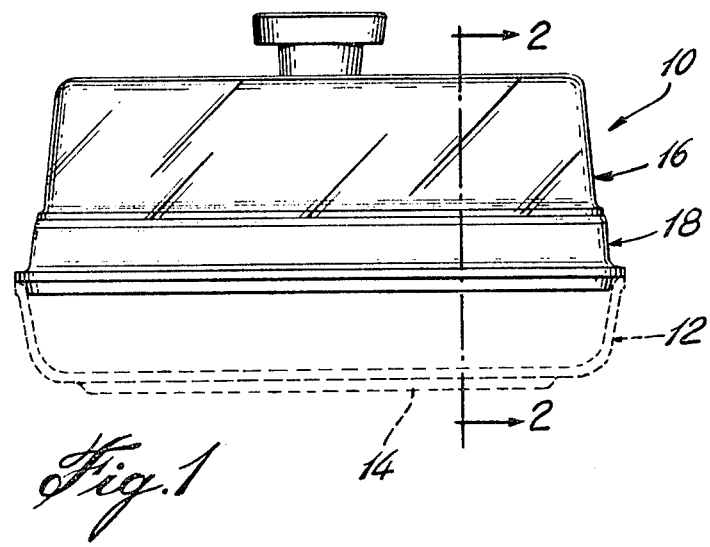
FIG. 1 is an elevation view of a frypan lid according to the invention, shown fitted on a frying pan represented in broken lines.

Referring to the drawings, there is illustrated a frypan lid generally designated by reference numeral 10 and shown fitted on a conventional electric frying pan 12 provided with an electric heating element 14. The lid 10 is made in two sections comprising an upper transparent plastic cover 16 and a lower heat resistant plastic collar 18 which is fixedly connected to the cover 16 and is adapted to fit on the rim 20 of the frying pan.

The collar 18 is preferably made of a heat resistant plastic material which resists heat up to a temperature of at least about 500° F. Examples of such a heat resistant plastic material are phenolic resins such as phenol-formaldehyde resin sold under the trademark BAKELITE, and a glass-filled thermoplastic polyester sold under the trademark VALOX. On the other hand, the cover 16 is preferably be made of transparent plastic material which resists heat up to a temperature of at least about 250° F., preferably about 300° F. Suitable plastic materials for the cover are, for example, polycarbonate, nylon and polysulfone plastics.

Figure 2:
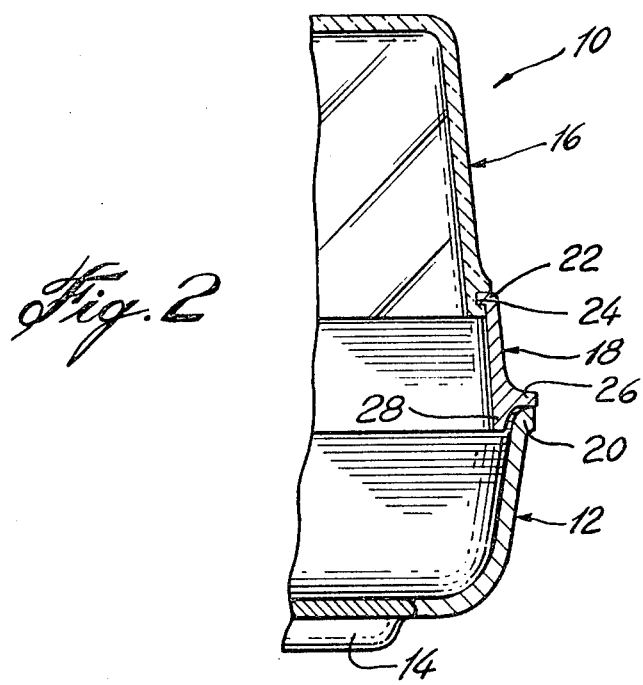
FIG. 2 is a part sectional view taken along line 2—2 of FIG. 1.

The cover 16 and collar 18 are connected together by means of a tongue and groove arrangement, as best shown in FIG. 2. Thus, the collar 18 has an inwardly extending peripheral tongue 22 and the cover 16 is provided with an outer facing peripheral groove 24 receiving the tongue 22 in fitting engagement so as to fixedly connect the cover and collar together.

As also shown in FIG. 2, the collar 18 has a laterally outwardly projecting peripheral flange 26 adapted to rest on the rim 20 of the frying pan. In order to prevent lateral displacement of the flange 26 relative to the rim 20, a rib 28 depends from the flange and is adapted to abut against the inner peripheral surface of the rim, thereby acting as a stop.

As it is apparent, the transparent plastic cover 16 is not in direct contact with the rim 20, but is rather spaced from the rim with the heat resistant plastic collar 18 interposed therebetween. The collar 18 serves a heat insulating body and thus prevents the high temperature produced by the frying pan 12 from reaching the cover 16 and adversely affecting it.

I claim:

1. A lid for a frying pan, comprising an upper transparent plastic cover and a lower heat resistant plastic collar fixedly connected to said transparent cover and adapted to fit on a rim of said frying pan, said collar acting as a heat insulating body between said cover and said frying pan whereby to prevent heat generated by said frying pan during use from adversely affecting said cover.

2. A frypan lid as claimed in claim 1, wherein said collar is made of a heat resistant plastic material which resists heat up to a temperature of at least about 500° F.

3. A frypan lid as claimed in claim 2, wherein said heat resistant plastic material is selected from the group consisting of phenolic resins and glass-filled thermoplastic polyesters.

4. A frypan lid as claimed in claim 3, wherein said heat resistant material is a phenol-formaldehyde resin.

5. A frypan lid as claimed in claim 1, wherein said cover is made of a transparent plastic material which resists heat up to a temperature of at least about 250° F.

6. A frypan lid as claimed in claim 5, wherein said transparent plastic material resists heat up to a temperature of at least about 300° F.

7. A frypan lid as claimed in claim 5, wherein said transparent plastic material is selected from the group consisting of polycarbonate, nylon and polysulfone plastics.

8. A frypan lid as claimed in claim 7, wherein said transparent plastic material is a polycarbonate plastic.

9. A frypan lid as claimed in claim 1, wherein said collar has an inwardly extending peripheral tongue adjacent an upper edge thereof and wherein said cover is provided with an outer facing peripheral groove adjacent a lower edge thereof, said groove receiving said tongue in fitting engagement whereby to fixedly connect said cover and collar together.

10. A frypan lid as claimed in claim 1, wherein said collar has a laterally outwardly projecting peripheral flange adapted to rest on the rim of said frying pan and a rib depending from said flange, said rib adapted to abut against an inner peripheral surface of said rim whereby to act as a stop preventing lateral displacement of said flange relative to said rim.

* * * * *